United States Patent [19]

Hermans et al.

[11] 4,210,738

[45] Jul. 1, 1980

[54] CATALYTIC COMPLEXES

[75] Inventors: Jean P. Hermans, Strombeek-Bever; Paul Henrioulle, Marilles, both of Belgium

[73] Assignee: Solvay & Cie, Brussels, Belgium

[21] Appl. No.: 236,407

[22] Filed: Mar. 21, 1972

[30] Foreign Application Priority Data

Mar. 23, 1971 [LU] Luxembourg ............................ 62841
Aug. 17, 1971 [LU] Luxembourg ............................ 63732
Oct. 8, 1971 [LU] Luxembourg ............................ 64034

[51] Int. Cl.² ........................ C08F 4/66; C08F 10/00; C08F 10/06
[52] U.S. Cl. .............................. 526/152; 252/429 B; 252/429 C; 526/119; 526/139; 526/140; 526/141; 526/142; 526/151; 526/153; 526/158; 526/161; 526/348.6; 526/351; 526/352; 526/908
[58] Field of Search ............ 252/429 A, 429 B, 429 C; 260/93.7, 94.9 C, 94.9 E; 526/119, 139–142, 151–153, 158, 161

[56] References Cited

U.S. PATENT DOCUMENTS

| | | | |
|---|---|---|---|
| 3,055,878 | 9/1962 | Sanoski ................................ 526/141 |
| 3,058,970 | 10/1962 | Rust et al. ...................... 260/94.9 E |
| 3,108,973 | 10/1963 | Vandenberg ........................ 526/159 |
| 3,116,274 | 12/1963 | Boehm et al. ........................ 526/142 |
| 3,128,252 | 4/1964 | Tornqvist et al. ............... 260/94.9 E |
| 3,189,591 | 6/1965 | Serra et al. ........................... 526/141 |
| 3,193,545 | 7/1965 | Argabright et al. .................. 526/140 |
| 3,243,420 | 3/1966 | Caunt ................................ 260/94.9 E |
| 3,244,477 | 4/1966 | Nicco et al. ............................. 23/87 |
| 3,267,086 | 8/1966 | Tornqvist ........................ 260/94.9 E |
| 3,300,457 | 1/1967 | Schmid et al. .............. 260/94.9 DA |
| 3,451,768 | 6/1969 | Luciana et al. ................. 260/94.9 E |
| 3,482,935 | 12/1969 | Trementozzi et al. ............... 526/158 |
| 3,558,271 | 1/1971 | Calcagno ........................ 260/94.9 C |
| 3,573,270 | 3/1971 | Trementozzi et al. .......... 260/94.9 E |
| 3,644,325 | 2/1972 | Roberts ............................. 260/94.9 C |
| 3,701,763 | 10/1972 | Wada et al. ...................... 260/94.9 E |
| 3,701,766 | 10/1972 | Delboville et al. .......... 260/94.9 DA |
| 3,766,160 | 10/1973 | Caunt ............................... 260/94.9 E |
| 3,825,524 | 7/1974 | Wada et al. .......................... 526/142 |

FOREIGN PATENT DOCUMENTS

| | | | |
|---|---|---|---|
| 246527 | 8/1963 | Australia ............................. 260/94.9 B |
| 263082 | 11/1965 | Australia . |
| 601919 | 7/1960 | Canada . |
| 764414 | 8/1967 | Canada . |
| 816243 | 6/1969 | Canada . |
| 117780 | 3/1966 | Czechoslovakia . |
| 2029992 | 12/1970 | Fed. Rep. of Germany . |
| 2110380 | 10/1971 | Fed. Rep. of Germany ...... 260/94.9 B |
| 1369718 | 7/1964 | France ................................ 260/94.9 E |
| 1548907 | 10/1968 | France . |
| 838028 | 6/1960 | United Kingdom . |
| 890913 | 3/1962 | United Kingdom . |
| 895595 | 5/1962 | United Kingdom . |
| 918740 | 2/1963 | United Kingdom . |
| 936995 | 9/1963 | United Kingdom . |
| 980023 | 1/1965 | United Kingdom . |
| 1001820 | 8/1965 | United Kingdom . |
| 1014944 | 12/1965 | United Kingdom . |
| 1017977 | 1/1966 | United Kingdom . |
| 1087314 | 10/1967 | United Kingdom . |
| 1120079 | 7/1968 | United Kingdom . |
| 1139450 | 1/1969 | United Kingdom . |
| 1147121 | 4/1969 | United Kingdom . |

OTHER PUBLICATIONS

Natta et al., Journ. Polymer Science, vol. 51 (1961), pp. 399–410.
Ruff et al., Zeitschrift für Anorganische Chemie, Band 128 (1923), pp. 81–95.
Boor, Journal of Polymer Science, Pt. A., vol. 3 (1965), pp. 995–1011.
Korotkov et al., Polymer Science, USSR, vol. 3, pp. 621–630 (1962).
Wilson et al., Journal of Polymer Science, Part C, No. 1, pp. 305–307 (1963).
Rodriguez et al., Journal of Polymer Science, Part A-1, vol. 4, pp. 1905–1950 (1966).
Ambroz et al., Journal of Polymer Science, Part C, No. 16, pp. 423–430 (1967).
Macromolecular Reviews, vol. 1, pp. 113–114 (1967).
Nitta, Science, vol. 147, pp. 261–272, Jan. 15, 1965.
Riff et al., Crystallin Olefin Polymers, Part I, vol. XX, Interscience Publ., N.Y. (1965), pp. 55, 56, 74.
Hock, Journal of Polymer Science, Part A-1, vol. 4, pp. 3055–3064 (1966).

Berks et al., Journal of Polymer Science, Part A-1, vol. 8, pp. 1037–1053 (1970).

*Primary Examiner*—Edward J. Smith
*Attorney, Agent, or Firm*—Spencer & Kaye

[57] ABSTRACT

Solid catalytic complexes are useful for stereospecific polymerization of α-olefins to solid crystalline polymers. The complexes are formed by reducing $TiCl_4$ with an alkylaluminum, treating thus-obtained reduced solid with a complexing agent and contacting the resultant with $TiCl_4$. They have a specific surface greater than 75 $m^2/g$.

46 Claims, 1 Drawing Figure

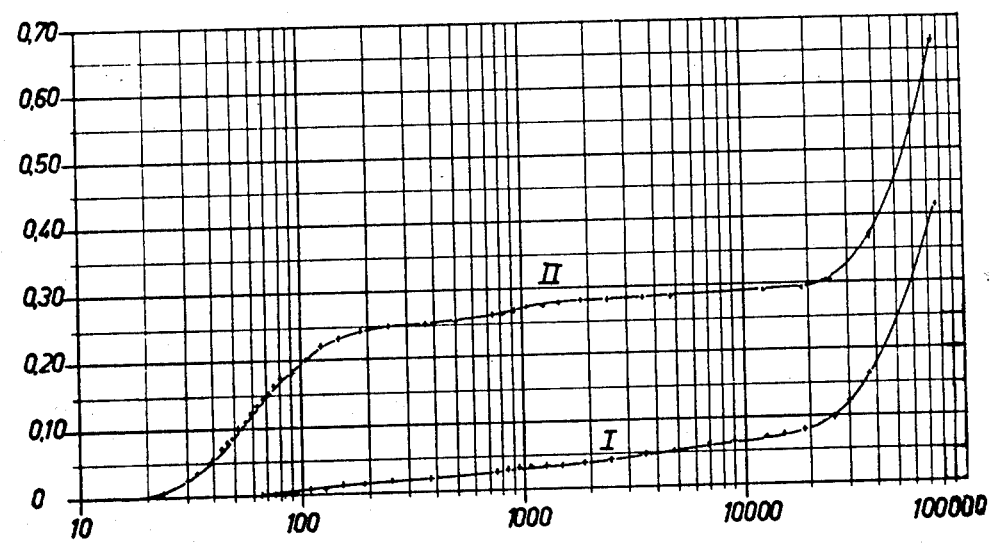

CATALYTIC COMPLEXES

BACKGROUND OF THE INVENTION

α-Olefins have been polymerized in contact with a catalytic system composed of solid TiCl$_3$ or of a solid composition of TiCl$_3$ with a metallic halide and an activator composed of an organic compound of aluminum.

Such solid TiCl$_3$ and solid composition are prepared by different known processes.

One of these processes consists of reducing TiCl$_4$ by means of hydrogen. When the resulting reduced chloride is used in the polymerization of α-olefins, however, reaction rate is low and the obtained product contains large amounts of amorphous polymer.

Another process consists of effecting the reduction of TiCl$_4$ by means of metallic aluminum. The reaction product contains TiCl$_3$ and AlCl$_3$. As these two chlorides are isomorphous, they cocrystallize and cannot be separated by conventional methods. When these compositions are used for the polymerization of α-olefins, large amounts of amorphous polymer likewise result.

According to another method of manufacturing TiCl$_3$, TiCl$_4$ is reduced by means of an alkylaluminum. The resulting TiCl$_3$ is normally brown and must be converted into violet TiCl$_3$ in order to obtain stereospecific polymerization of α-olefins therewith. Even after this conversion the stereospecificity of the catalyst usually remains mediocre.

To improve the stereospecificity of such catalytic system, complexing agents are used to reduce the amount of aluminum derivatives present in the reduced solid.

Thus, in Dutch Patent Application No. 66.10335 of July 22, 1966, in the name of Soc. Italiana Resine, a process for the preparation of TiCl$_3$ is described in which the reduction of TiCl$_4$ is effected by an organometallic compound and an ether is a constituent of the reaction medium. The temperature of the reaction medium is brought to between 150° and 200° C. to promote the stereospecificity of the catalytic system.

British Patent No. 1,139,450 of Dec. 27, 1967, in the name of Shell, describes a process for preparing beta TiCl$_3$ in which TiCl$_4$ is reduced by diethylaluminum chloride. The ethylaluminum dichloride formed in the course of this reaction is removed by bringing it into contact with a complexing agent. The beta crystalline form is converted into the gamma form so that a more stereospecific catalytic system can be obtained by heat treatment, preferably effected at a temperature between 150° and 160° C.

Belgian Patent No. 610,761 of Nov. 24, 1961, in the name of Eastman Kodak describes a process for preparing TiCl$_3$ in which the reduction of TiCl$_4$ is effected by aluminum and in the presence of a complexing agent capable of forming a complex with the aluminum halide formed in the course of the reaction. The complex is soluble in the complexing agent.

Belgian Patent No. 655,308 of Nov. 5, 1964, in the name of Mitsui, describes a process for preparing a catalytic composition in which a composition containing violet TiCl$_3$ is ground in the presence of a small amount of a monoether or monoketone. The composition is obtained by reducing TiCl$_4$ with metallic aluminum powder in the presence of AlCl$_3$. With these catalytic compositions there are obtained polymers, the content of amorphous products of which is relatively low.

The use of ether in the preparation of the catalytic complex improves the stereospecificity and slightly improves the activity of the catalytic system used; the latter, however, remains fairly low.

SUMMARY OF THE INVENTION

The present invention relates to solid titanium trichloride catalytic complexes, to a process for the preparation of these catalytic complexes and to a process for the polymerization of α-olefins into solid crystalline polymers by means of these catalytic complexes.

By using complexing agents in a particular manner in the preparation of catalytic complexes based on TiCl$_3$, solids are obtained which have a large surface and which constitute catalytic systems having substantially higher activity and very good stereospecificity.

The solid catalytic complexes are based on TiCl$_3$, are porous and are useful for stereospecific polymerization of α-olefins. These complexes are in a form wherein their specific surface is greater than 75 m$^2$/g.

Catalytic complexes of the invention are prepared by reducing TiCl$_4$ with an alkylaluminum, optionally separating from employed formation medium a reduced solid based on TiCl$_3$, treating the reduced solid with a complexing agent, separating any excess of the latter, bringing thus-treated solid into contact with TiCl$_4$, and separating thus-formed catalytic complex. The reduction of TiCl$_4$ into a solid product based on TiCl$_3$ is effected by a reducing agent of the general formula:

wherein

R is a hydrocarbon radical containing from 1 to 18, preferably from 1 to 12, carbon atoms; best results are obtained when the hydrocarbon radical is alkyl, aryl, aralkyl, alkarly or cycloalkyl, preferably alkyl with from 2 to 6 carbon atoms;

X is halogen, i.e. fluorine, chlorine, bromine or iodine; best resuls are obtained when the halogen is chlorine;

n is any number greater than zero and not more than 3, preferably from 1.5 to 2.5, inclusive; best results are obtained when n is 2.

The invention also includes isoprenylaluminums and their use as reducing agents. The isoprenylaluminums are organoaluminum polymeric compounds obtained by reacting trialkylaluminums, in which each alkyl has from 1 to 18 carbon atoms, with diolefins containing from 4 to 18 carbon atoms. They are similar (in every way other than in structure) to reducing agents of the formula: AlR$_3$.

BRIEF DESCRIPTION OF THE DRAWING

The single FIGURE is a graph of cumulative porous volume (cc/g) versus radius (Å) for treated solid (I) and solid catalyst complex (II).

DETAILS

The reduction reaction is preferably carried out under conditions which bring about precipitation of a solid product (based on TiCl$_3$) which has favorable morphological characteristics and, in particular, a spheroidal form with a grain diameter between 5 and 100 microns, preferably between 15 and 50 microns, with a close distribution of diameters around the mean value.

The free-flowing characteristics of the reduced solid obtained in this manner are excellent, and the apparent density of such solid is very high (from 0.8 to 1.3 kg/dm$^3$).

In order to obtain this reduced solid of good morphology, the reduction reaction is carried out under mild conditions, with slight agitation, at a temperature between −100° and 30° C., preferably between −50° and 20° C. The most favorable results are obtained when the reduction reaction is carried out at 0°±2° C. The reaction is advantageously effected in an inert diluent, such as those normally used in polymerizing olefins, preferably an aliphatic or cycloaliphatic hydrocarbon containing from 5 to 12 carbon atoms. The diluent most often used is hexane. This type of diluent is employed throughout the preparation of the catalytic complex.

Examples of other suitable diluents are pentane, heptane, octane, decane, dodecane, cyclohexane, methylcyclohexane and mixtures thereof.

The slight agitation may be effected, for instance, by means of a rotary blade agitator, the rotation speed of which is comprised between 100 and 400 rpm and preferably between 150 and 250 rpm.

According to a convenient procedure TiCl$_4$ is dissolved in the inert diluent (100 to 400 ml of TiCl$_4$, preferably 200 to 300 ml of TiCl$_4$, per liter of diluent) and the reducing agent, which is likewise dissolved in a diluent (250 to 500 g, preferably 350 to 425 g, of reducing agent per liter of diluent) is progressively added thereto. The addition of the reducing agent is preferably extended over a long time, for example more than 1 hour and preferably longer than 3 hours. The amount of reducing agent employed is about one mole per mole of TiCl$_4$. Nevertheless, a slight excess of reducing agent (for example less than 25% excess) does not impair the formation of a reduced solid of good morphology.

According to another method the TiCl$_4$ and the reducing agent are dissolved at a very low temperature (for example between −100° and −50° C.) and the temperature of the resulting solution is then allowed to rise very slowly to ambient temperature in accord with a preestablished program, for example within a period of more than six hours, e.g. a period of from seven to twelve hours.

After the reagents have been brought together, the temperature of the reaction mixture is progressively raised to a value between 20° and 120° C., preferably between 40° and 100° C., under continuous moderate agitation. Heat treatment is then effected at this moderate temperature, maintaining the temperature throughout the period, which is advantageously longer than 15 minutes. The higher the temperature at which the heat treatment is effected, the shorter the time generally required for this treatment. The reduced solid prepared in this manner is optionally separated from the reaction medium by any known means and then washed with diluent. Separation may be carried out for instance by decantation, filtration or centrifugation.

The obtained reduced solid is not pure TiCl$_3$, but is a composition containing chlorinated and/or hydrocarbon aluminum compounds, preferably in a relationship of more than 0.3 molecule of aluminum-based compound to one molecule of TiCl$_3$. This reduced solid comprise substantially TiCl$_3$ of beta crystalline form. Its specific surface is small (about 1 m$^2$/g). The catalytic properties of this reduced solid are not interesting. More particularly, its stereospecificity and its activity are poor.

The reduced solid prepared in this manner is then treated with a complexing agent, such as a compound capable of forming a complex with a titanium halide, an aluminum halide or an aluminum organohalide. Organic complexing compounds, containing one or more atoms or groups having one or more pairs of free electrons capable of effecting coordination with titanium and/or aluminum, are preferred. These compounds contain from 1 to 30 carbon atoms per electron donor atom or group.

Atoms capable of donating one or more pairs of electrons include atoms of non-metals of groups V and VI of the Periodic Table, such as oxygen, sulphur, nitrogen, phosphorus, antimony and arsenic.

Compounds containing groups capable of furnishing one or more pairs of electrons include, but are not limited to, ethers, thioethers, and thiols.

Preferred complexing agents are of the general formulae: R'-O-R'', R'-S-R'', and R'-S-H, in which R' is a hydrocarbon radical containing from 1 to 15 carbon atoms and preferably alkyl, aryl, aralkyl, alkaryl or cycloalkyl; R'' is a radical of the same type, identical with or different from R'.

Best results are obtained when R' and R'' are identical linear or branched aliphatic radicals, containing from 2 to 8, preferably from 4 to 6, carbon atoms.

Among the compounds which may be used are:
ethers, such as diethylethers, dipropylethers, dibutylethers, diamylethers, methyl-n-butylether, n-butyl-n-pentylether, dioxane, anisol, phenyl-ethylether thioethers, such as diethylthioethers, dibutylthioethers, propylbutylthioethers, diamylthioethers, thianisol, isopropylphenylthioether thiols, such as ethylmercaptan.

The treatment of the reduced solid by means of the complexing agent is advantageously effected in the presence of the diluent which was used in the reduction of TiCl$_4$ when the reduced solid is not separated. The reduced solid is kept in suspension by agitation. A fresh diluent of the same type may also be used. The amount of diluent is so selected that the reduced solid content is between 0.03 and 4 moles of TiCl$_3$ per liter of diluent, and preferably between 0.3 and 2 moles of TiCl$_3$ per liter of diluent. The temperature during the treatment is not critical. It is advantageous to operate at a temperature between 0° and 80° C.

Moreover, the treatment time is also not critical. A time in excess of 5 minutes is preferred.

The amount of complexing agent employed is between 0.1 and 2.5 moles, and preferably between 0.5 and 1.75 moles, per mole of TiCl$_3$ present in the reduced solid. Best results are obtained when an amount of complexing agent between 0.8 and 1 mole per mole of TiCl$_3$ (present in the reduced solid) is used.

The solid treated in this manner may optionally be separated from the treatment medium by decantation or filtration and washed by means of inert diluent.

The treated solid is in a physical form similar to that of the reduced solid and has a similar specific surface. From a chemical viewpoint, apart from beta TiCl$_3$ and the aluminum compound, it also contains complexing agent. The catalytic properties of this treated solid are just as mediocre as those of the reduced solid.

The treated solid is then brought into contact with TiCl$_4$ so as to form the catalytic complex of the present invention. The treated solid may be reacted with TiCl$_4$ by means of pure TiCl$_4$ or in the presence of an inert diluent. In the latter case the concentration of the TiCl$_4$ is in excess of 15% by volume and is preferably between 30 and 40% by volume. This solution may optionally contain a certain amount of added complexing agent or of complexing agent coming from the preceding operation.

The reaction of the treated solid with $TiCl_4$ is effected at a temperature between $-30°$ and $+100°$ C., and preferably between 40° and 80° C. Best results are obtained when the temperature is between 60° and 70° C. The reaction time is selected to obtain a catalytic complex of a color tending toward violet and is advantageously between 30 minutes and four hours, preferably between 1 and 3 hours. In the course of the reaction of formation of the catalytic complex, the treated solid is kept in suspension by moderate agitation. The catalytic complex is separated from its reaction medium by filtration or decantation and is washed with diluent to eliminate residual $TiCl_4$ and by-products of the reaction.

Treatment of the reduced solid with complexing agent is alternatively effected simultaneously with the reaction with $TiCl_4$. In this case the operating conditions are identical, mutatis mutandis, with those defined above for the two operations (carried out in succession).

The catalytic complex prepared in this manner is in the form of spherical particles having uniform structure and density; the diameter of the particles is generally between 5 and 100 microns and preferably between 15 and 50 microns. Best results are obtained with particles having diameters between 20 and 40 microns. In addition, these particles are characterized by close distribution of diameters around the mean value. Consequently, these particles have excellent free-flowing characteristics when they are processed. Their apparent density is high. As a rule it is in excess of $0.6 \text{ kg/dm}^3$ and preferably higher than $0.8 \text{ kg/dm}^3$. The spherical particles are themselves constituted by an agglomerate of microparticles of more or less spherical shape and having a diameter between 0.05 and 1 micron, preferably between 0.1 and 0.3 micron. The structure of these microparticles is not dense but, on the contrary, very porous. Examination of these microparticles by electronic microscope shows that they are characterized by a cellular structure due to the fact that they are composed of microcrystallites the dimensions of which are in the order of 50–100 Å. This porous structure is further confirmed by the high value of the specific surface of the catalytic complexes of the invention. The surface is in excess of 75 $m^2/g$ and preferably higher than 100 $m^2/g$. Best results are obtained with a catalytic complex having a specific surface higher than 125 $m^2/g$. Specific surfaces in the order of 150 and even 200 $m^2/g$ are easily obtained. Commercial catalysts have much lower specific surfaces, even when they have been found. Catalyst elements having a very small mean dimension are obtained by grinding; this leads to poor morphology and consequently to mediocre free-flowing characteristics.

The total porosity of the spherical particles is also important; as a rule it is in excess of 0.15 cc/g and preferably higher than 0.20 cc/g. The space existing between the microparticles constituting the spherical particles makes little contribution to the total porosity of these spherical particles. As a rule this contribution is in the order of 0.04 cc/g. On the other hand, the microparticles themselves have many cracks, and their special structure accounts for the very high specific surfaces and porous volumes which are measured.

The morphological characteristics are confirmed by nitrogen adsorption and desorption isotherm determinations at the temperature of liquid nitrogen, by measurement of porosity by the penetration of mercury, and also by observation made with the electronic microscope on samples which have been fragmented in order to make the material transparent.

The special structure of the spherical particles of the present invention may be summarized by giving them the name "spogospheres".

The catalytic complexes of the invention have an original morphology because of their "spogospheroidal" structure, their very high porous volume, and their favorable apparent density (in the order of $0.9 \text{ kg/dm}^3$), and narrow distribution of particle diameters.

The catalytic complexes of the invention are based on a $TiCl_3$ the color of which tends towards violet and which belong to the delta crystalline form according to generally adopted classification (Journal of Polymer Science, 51, 1961, p. 399–410).

X-ray diffraction spectra for this structure have been recorded with the aid of a focusing goniometer equipped with a monochromator.

The positions of the X-ray diffraction spectrum lines of the catalytic complexes of the invention and of the titanium trichlorides obtained by hydrogen reduction of $TiCl_4$ and grinding are identical, i.e. within the limits of accuracy of measurement.

On the other hand, a real difference appears for the solid compositions (based on $TiCl_3$ and $AlCl_3$) obtained by aluminum reduction of $TiCl_4$ and grinding; for catalytic complexes of the invention there is a line corresponding to the planes of reticular distance $d=1.772$ Å, just as in the case of titanium trichloride prepared by hydrogen reduction of $TiCl_4$ and grinding, whereas for the solid compositions based on $TiCl_3$ and $AlCl_3$ (obtained by reducing $TiCl_4$ with aluminum and grinding) the reticular distance of the plane corresponding to the homologue peak is 1.761 Å.

The X-ray diffraction spectra of the catalytic complexes of the invention are likewise remarkable for the widening of certain lines, and in particular the widening observed for the line corresponding to the plane of reticular distance $d=5.85$ Å. This widening may be appreciated by measuring the width halfway up the line. The catalytic complexes of the invention are characterized by a width 20%, and usually 40% greater than that measured for the titanium trichlorides obtained by reducing $TiCl_4$ with hydrogen and for the solid compositions based on $TiCl_3$ and $AlCl_3$ obtained by reduction of $TiCl_4$ with aluminum.

The widening is greater than 100% for the samples cited in Table 7 (for convenience Tables 1–7 appear at the end of this specification).

The X-ray diffraction spectra of the catalytic complexes of the present invention comprise lines, particularly the line corresponding to the plane of reticular distance $d=2.71$ Å, with higher maximum intensity than those obtained for titanium trichloride prepared by hydrogen reduction of $TiCl_4$ and for solid compositions (based on $TiCl_3 + AlCl_3$) obtained by reducing $TiCl_4$ with aluminum.

The catalytic complexes of the present invention correspond to the following general formula:

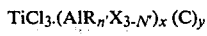

$$TiCl_3.(AlR_{n'}X_{3-N'})_x (C)_y$$

wherein each of R and X has its previously-indicated meaning:

n' is a number from zero to 3, inclusive, preferably equal to or less than 2, and especially equal to 1;

x is the number (any number lower than 0.30, preferably lower than 0.20) of molecules of aluminum compound per molecule of $TiCl_3$;

C is a complexing agent as defined in the preceding description; and y is the number of molecules of complexing agent per molecule of $TiCl_3$; it is any number greater than 0.001 and preferably greater than 0.009; as a practical matter difficulty is experienced in exceeding 0.11 molecule of complexing agent per molecule of $TiCl_3$.

The catalytic complexes of the invention are used for polymerizing α-olefins to highly crystalline polymers. They are used together with an activator, which is an organic compound of a metal of groups Ia, IIa and IIIa of the Perodic Table, preferably of aluminum and of the formula $AlR_m'''X_{3-m}$; it may be identical to or different from, but of the same formula as, the aluminum-based compound used as reducing agent in the preparation of the reduced solid. Best results are obtained with diethyl aluminum chloride because the latter provides maximum activity and stereospecificity of the catalytic system.

Suitable activators include butyllithium, amylsodium, diethylmagnesium, ethylmagnesium chloride, triethylborane, triethylaluminium, triisobutylaluminium and monoethylaluminium dichloride.

The catalytic systems (catalytic complex and activator) thus defined are used for the polymerization of terminally unsaturated olefins which contain from 2 to 18, preferably 2 to 6, carbon atoms, such as ethylene, propylene, butene-1, pentene-1, the methylbutenes-1, hexene-1, 3-and 4-methylpentenes-1, and vinylcyclohexene. They are particularly interesting for the polymerization of propylene, butene-1, and 4-methylpentene-1, respectively, into highly isotactic crystalline polymers. They are likewise utilizable for the copolymerization of these α-olefins with one another and also with diolefins containing from 4 to 18 carbon atoms. The diolefins are preferably non-conjugated aliphatic diolefins, such as hexadiene-1,4, non-conjugated monocyclic diolefins, such as 4-vinylcyclohexene, alicyclic diolefins having an endocyclic bridge, such as dicyclopentadiene, methylene- and ethylidenenorbornene and conjugated aliphatic diolefins, such as butadiene or isoprene.

They are also used for the production of so-called block copolymers, which are produced from α-olefins and diolefins. These block copolymers consist of successions of chain segments of variable length. Each segment consists of a homopolymer of an α-olefin or of a statistical copolymer containing an α-olefin and at least one α-olefin or diolefin comonomer. The α-olefin or diolefin is one of those previously mentioned.

The process of the invention is particularly well suited to the production of propylene homopolymers and of copolymers containing a total of at least 50% by weight of propylene and preferably 75% by weight of propylene.

The polymerization may be effected by any known process: dissolved or suspended in a hydrocarbon solvent or diluent which is preferably an aliphatic or cycloaliphatic hydrocarbon, such as butane, pentane, hexane, heptane, cyclohexane, methylcyclohexane, or mixtures thereof. The polymerization is, alternatively, effected in the monomer or one of the monomers, which is kept in liquid state or further in the gaseous phase.

The polymerization temperature is generally between 20° and 200° C., and preferably, when operating in suspension, between 50° and 80° C. The pressure is generally between atmospheric pressure and 50 atmospheres, preferably between 10 and 25 atmospheres. This pressure is of course temperature dependent.

The polymerization is effected continuously or batchwise.

The preparation of so-called block copolymers is also effected by known processes with the subject catalytic systems. A two-stage process is preferred. An α-olefin, generally propylene, is first polymerized by a previously described method for homopolymerization. Another α-olefin and/or diolefin, generally ethylene, is then polymerized in contact with the still-active homopolymer chain. This second polymerization may be effected after monomer (which did not react in the course of the first stage) has been completely or partially removed.

The organometallic compound and the catalytic complex are, e.g., separately added to the polymerization medium. Alternatively, they are brought into contact, at a temperature between $-40°$ and $80°$ C., for a period of time which may extend up to 2 hours before they are introduced into the polymerization reactor together.

The total amount of organometallic compound (activator) used is not critical; it is generally greater than 0.1 millimole (mmole) per liter of diluent, of liquid monomer, or of reactor volume, and preferably greater than 1 mmole per liter.

The amount of catalytic complex used is dependent on its $TiCl_3$ content. Generally, the concentration of $TiCl_3$ in the polymerization medium is more than 0.01 mmole per liter of diluent, of liquid monomer, or of reactor volume, and preferably greater than 0.2 mmole per liter.

The ratio of amounts of organometallic compound and of catalytic complex is, likewise, not critical. Generally, the molar ratio of organometallic compound to $TiCl_3$ present in the complex is between 0.5 and 10, preferably between 1 and 8. Best results are obtained when the molar ratio is between 2 and 5.

The molecular weight of the polymers produced by the process of the invention can be controlled by adding to the polymerization medium one or more molecular weight modifying agents, such as hydrogen, zinc diethyl, alcohols, ethers, and alkyl halides. Every known molecular-weight controlling agent may be used including for instance butanol, octanol, diethylene and butylchloride.

Addition to the polymerization medium of complexing agents of the same type as those used in the preparation of the catalytic complexes is not excluded. However, such addition does not have much influence on the behavior of the catalytic complexes of the invention.

The obtained polymer, which is an enlarged replica of the catalytic complex, also has good free-flowing characteristics. For numerous applications the polymer is thus readily handled and delivered directly without previously undergoing granulation.

The stereospecificity of the catalytic complexes of the invention is extremely high. For example, the proportion of amorphous polypropylene, evaluated by measuring the weight of polypropylene soluble in hexane in relation to the total polypropylene produced in the course of the polymerization, is less than 5%, and almost always lower than 2%, by weight. The stereospecificity of commercial catalysts is substantially inferior. Catalysts produced by reduction by means of hydrogen or metallic aluminum, and optionally impregnated with complexing agent before polymerization, product about 10% by weight of polypropylene soluble in diluent. The excellent stereospecificity of the catalytic complexes obviates purification of obtained polymer to remove any amorphous fraction, thus achieving a very appreciable saving in energy, raw materials, and plant. Moreover, the polymer is characterized by exceptionally high isotacticity and crystallinity, e.g., in the homopolymerization of propylene.

The activity of the catalytic complexes of the invention is remarkably high. Thus, in the homopolymerization of propylene it is of the order of 1900 g of polymer per hour per g of $TiCl_3$ contained in the catalytic complex. These results are incomparably higher than those obtained by using prior art catalysts. Under the same operating conditions the activity of catalysts (prepared by hydrogen or metallic aluminum reduction of $TiCl_4$, grinding, and optional impregnation with complexing agent) is, at a maximum, in the order of 400 g of polymer per hour per g of $TiCl_3$.

The catalytic complexes of the invention retain their initial activity much longer than conventional catalysts. Consequently, total productivity expressed in g of polymer per g of $TiCl_3$ used is very substantially to the advantage of the catalytic complexes of the invention. The high activity and productivity of the catalytic complexes of the invention make it possible to obtain polymers with a very low content of catalytic residue. This content is lower than 100 parts per million (ppm) and is generally in the order of only 30 ppm of titanium. For numerous applications it is consequently unnecessary to purify the polymer to remove catalytic residues. This, once again, constitutes a substantial saving in energy, raw materials, and plant.

Throughout the preceding text (unless otherwise indicated) each reference to "hydrocarbon" encompasses alkanes, aromatics, alkyl-substituted aromatics, aromatic-substituted alkanes, cycloalkanes and alkyl-substituted cycloalkanes. Each aromatic (also "ar-" or "aryl-") is a carbocyclic aromatic, particularly one with one or two rings, such as benzene, naphthalene, diphenyl and tetrahydronaphthalene. Each cycloalkane preferably has from 5 to 9 ring carbon atoms, e.g. cyclopentane, cyclohexane and cyclononane. Exemplary alkanes are either straight- or branched-chain and include ethane, propane, isobutane, octane, decane and dodecane. Each alkyl is an alkane minus one hydrogen atom. Hydrocarbons designated as "aliphatic" include both alkanes and ethylenically unsaturated straight- and branched-chain hydrocarbons, e.g. isooctene. The unsaturation is either mono-, e.g. 1-octene, or polyunsaturation; polyunsaturation is either conjugated, e.g. 2,4-hexadiene, or non-conjugated, e.g. 1,4-pentadiene. Cycloaliphatic hydrocarbons likewise include ethylenic unsaturation, e.g. cyclohexene and cyclopentadiene.

The following examples are given to illustrate the invention. They are merely exemplary and, in no way, limitative. Various changes can be made in the process and respective products without departing from the spirit and scope of the invention or materially sacrificing its advantages.

In these examples the symbols used have the following meanings and are expressed in the units indicated hereinbelow.

C/Ti: molar ratio between the amounts of complexing agents and $TiCl_3$ present in the catalytic complex.

Al/Ti: molar ratio between the aluminum compound and $TiCl_3$ present in the catalytic complex.

S: specific surface of the catalytic complex in square meters per gram ($m^2/g$).

$\alpha$: activity expressed conventionally in grams of polymer insoluble in the polymerization diluent which are obtained per hour per gram of $TiCl_3$ contained in the catalytic complex.

% soluble: expresses the weight of polymer soluble in the polymerization diluent in relation to the total weight of polymer produced in the course of the polymerization test.

G: modulus of torsional rigidity for 60° arc and at 100° C. (draft recommendation ISO 469) expressed in $kg/cm^2$.

MFI: melt flow index measured under a load of 2.16 kg at 230° C. and expressed in decigrams per minute (dg/min) (standard ASTM D 1238).

PSA: apparent density of fluff, expressed in $g/dm^3$.

EXAMPLE 1

Preparation of Reduced Solid 600 milliliters (ml) of hexane (diluent) and 150 ml of $TiCl_4$ are introduced, in an inert (e.g. nitrogen) atmosphere, into a 2-liter reactor equipped with a two-blade agitator rotating at 160 revolutions per minute (rpm). This hexane-$TiCl_4$ solution (250 ml/l of diluent) is cooled to 1° C. Within 4 hours there is added a solution composed of 450 ml of dry hexane and 173 ml of $AlEt_2Cl$ [371 grams per liter (g/l) of diluent], the temperature in the reactor being kept at 1° C.

After adding the hexane-$AlEt_2Cl$ solution, the reaction medium (composed of a suspension of fine particles) is kept under agitation at 1° C. for about 15 minutes and then brought to 65° C. within about 1 hour. The reaction medium is then kept under agitation for 1 hour more at 65° C.

The liquid phase is then separated from the solid by filtration and the solid product, which is brown in color, is washed 5 times with 500 ml of dry hexane, the solid being resuspended for each wash. Finally, the solid product is freed from absorbed hexane by flushing with the aid of nitrogen. 285 g of dry product are collected, and will be referred to hereafter as "reduced solid"; the dry product contains about 200 g of $TiCl_3$ of beta crystalline variety.

Treatment of the Reduced Solid with Complexing Agent

The obtained reduced solid (285 g) is suspended in 1720 ml of diluent (hexane), and 256 ml of di-iso-amyl ether (EDIA) is added to it. This corresponds to 0.95 mole of EDIA per mole of $TiCl_3$ and to 116 g of EDIA/l of diluent. The suspension is agitated for 1 hour at 35° C. The "treated solid" obtained is then separated from the liquid phase and is washed 5 times with 500 ml of hexane at 25° C. The treated solid may optionally be dried with dry nitrogen.

Reaction of Treated Solid with $TiCl_4$

The treated solid is suspended in 850 ml of a 40 volume % solution of $TiCl_4$ in hexane. The suspension is kept under agitation at 65° C. for 2 hours. The liquid phase is then eliminated and the obtained solid product, called "solid catalytic complex", is washed 4 times with 500 ml of hexane at 25° C. and finally once with 500 ml of hexane at 65° C. The solid catalytic complex is separated from the hexane and dried with pure dry nitrogen. 256 g of dry solid catalytic complex are collected.

Characteristics of Treated Solid and Catalyic Complex

The specific surface (according to British Standard BS 4359/1), the porosity, and the texture of these solids were determined by methods comprising the adsorption of $N_2$ at the temperature of liquid nitrogen and of penetration of Hg.

In this last method use is made of a test tube containing the sample of which it is desired to determine the distribution of the porous volume in dependence on pore radii. Mercury is introduced into the test tube and a pressure varying from 1 to 1000 kilograms per square centimeter ($kg/cm^2$) absolute is applied to the whole arrangement. Through the action of the pressure the mercury penetrates into the pores of the sample, and the corresponding variation of volume is measured. This method makes it possible to determine the distribution of the porous volume in dependence on pore radii smaller than 75000 Å and >75 Å.

The combined use of methods (comprising the adsorption of nitrogen for pores the radii of which are smaller than 75 Å and penetration of mercury in the case of pores the radii of which are between 75 and 75000 Å) makes it possible to determine the distribution of porous volume in dependence on pore radii smaller than 75000 Å. The total porous volume is then readily calculated by integration.

These characteristics are indicated for the treated solid and for the corresponding catalytic complex:

| Specific surface, $m^2/g$ | | Treated solid | Catalytic complex |
| --- | --- | --- | --- |
| | | 1.6 | 180 |
| Porous | Measured by $N_2$ (for <500 Å) | 0.035 | 0.26 |
| Volume | Measured by Hg (for >75 Å) | 0.41 | 0.50 |
| cc/g | Porous volume (for <75000 Å) | 0.414 | 0.668 |

The combined methods of nitrogen adsorption and mercury penetration produce the curve (I) for the treated solid and the curve (II) for the solid catalytic complex (see accompanying figure).

In this figure the cumulative porous volume in cubic centimeters per gram (cc/g) is shown as ordinate and the pore radius expressed in Å as abscissa in a semilogarithmic diagram. In this diagram two main zones appear:

The zone corresponding to pores the radii of which are smaller than 15000 Å are attributed to the "internal" porous volume of the spherical particles:

the zone corresponding to pores the radii of which are greater than 15000 Å are attributed to the "external" porous volume contained between the spherical particles.

In the zone comprising the pores of radii smaller than 15000 Å, there are distinguished:

the zone of pore radii smaller than 200 Å which correspond to the "internal" porous volume of microparticles constituting the spherical particles;

the zone of pore radii greater than 200 Å which correspond to the "external" volume contained between the microparticles constituting the spherical particles.

Curve (I) (treated solid) reflects that the internal porous volume of the spherical particles is small and is constituted only by the space contained between the microparticles.

On the other hand, curve II (solid catalytic complex) shows that the space contained between the microparticles makes little contribution to the internal porous volume of the spherical particles (spogospheres), and that the great porosity of the spogospheres is due to the special structure of the microparticles, like the specific surface of the whole product.

The adsorption and desorption isotherm at the temperature of liquid nitrogen is determined. Exploitation of this isotherm makes it possible:

to establish the line of the "t-diagram" by the LIPPENS and DE BOER method (J. Colloid and Interface Sci, 21, p. 405, (1966), J. Catalysis, 3, p. 32, 38 and 44, (1964), Structure and Texture of Alumines, These Delft, 1961);

to classify the isotherms and hysteresis loops by the methods of "DE BOER" (The Structure and Properties of Porous Materials—Everett and Stone, Butterworth, London, 1958) and de BRUNAUER, L. DEMING, W. DEMING, TELLER (J. Am. Chem. Soc., 62, p. 1723 (1940); and to calculate the distribution of the specific surface and porous volume in dependence on the dimensions of pores by the method of BROEKHOFF and DE BOER (J. Catalysis, 9, p. 8 and 15 (1967) and 10, p. 153 and 368 (1968).

The combination of the information obtained by the above methods makes it possible to state that:

the solid catalytic complex gives rise to the phenomenon of capillary condensation of nitrogen and is characterized by nitrogen adsorption isotherms of type IV according to J. Am. Chem. Soc., 62, (1940), p. 1723, and a hysteresis loop of type E according to "The structure and properties of porous materials," Everett-Stone, Butterworth, London (1958), p. 68 to 94. Consequently the catalytic complex of the invention possesses pores formed by agglomerates of spheroidal particles (spogospheres);

and the treated solid has a nitrogen adsorption isotherm of type II and does not give rise to the phenomenon of hysteresis. Consequently the treated solid does not have a spogospheroidal structure, its microparticles not being porous.

The existence of microparticles in the spogospheres and the texture of the microparticles have been confirmed by electronic microscope observation on a sample of the catalytic complex which had been fragmented to make the material transparent. The cellular structure forming a sort of network (in which the mesh dimension is in the order of 50 to 100 Å) is very clearly seen at a magnification of 100,000.

In addition, under an optical microscope (magnification 200) the particles of reduced solid, treated solid, and catalytic complex are seen to have a spherical shape. The dimension of these spherical particles is between 25 and 35 microns.

The apparent specific gravities are, respectively, 1.0 kilogram per cubic decimeter ($kg/dm^3$) for the reduced solid and 0.9 $kg/dm^3$ for the catalytic complex.

The crystalline structure of the $TiCl_3$ is essentially beta in the reduced solid and treated solid and delta in the catalytic complex. The characteristics of the X-ray diffraction spectrum recorded by means of a focussing goniometer are shown in Table 7 (Example 1).

The chemical composition of the catalytic complex of Example 1 is as follows:

$$\text{Molar ratio } \frac{\text{AlEt}_n\text{Cl}_{3-n}}{\text{TiCl}_3} = 0.032$$

$$\text{Molar ratio } \frac{\text{EDIA}}{\text{TiCl}_3} = 0.061$$

Polymerization of Propylene with the Aid of the Solid Catalytic Complex—Conditions 1a: Suspended in Hexane 1 liter of dry, purified hexane is introduced into a dry stainless steel 5-liter autoclave which has been flushed out several times with nitrogen. 400 mg of AlEt$_2$Cl (in the form of a 200 g/l solution in hexane) and 119 mg of the solid catalytic complex (103 mg of TiCl$_3$) are then introduced in succession. The molar ratio AlEt$_2$/TiCl$_3$ is then 5.

The autoclave is heated to 60° C. and returned to atmospheric pressure by slow degasification. An absolute pressure of hydrogen of 0.15 kg/cm$^2$ is then produced in the autoclave, whereupon propylene is introduced until a total pressure at the temperature in question of 10.3 kg/cm$^2$ is reached. This pressure is kept constant during polymerization by introducing gaseous propylene.

After 2 hours the polymerization is stopped by discharging propylene and introducing 20 ml of isopropyl alcohol into the autoclave.

The contents of the autoclave are poured over a Büchner filter, rinsed three times with 0.5 liter of crude hexane, and dried under reduced pressure at 50° C. 400 g of polypropylene, which is insoluble in hexane, is collected; this corresponds to a catalytic activity of 1941 g polypropylene/h.g TiCl$_3$ and to a productivity of 3360 g of polypropylene/g of solid catalytic complex.

2 g of soluble polypropylene, which corresponds to 0.5% of soluble polypropylene, are found in the hexane used for polymerization and for washing the insoluble polypropylene.

The characterstics of the fraction of polypropylene which is insoluble in hexane are as follows:

% of isotactic diads: 96.2% [evaluation by nuclear magnetic resonance (NMR)]

G = 905 kg/cm$^2$

MFI = 2.8 g/10 min

PSA = 455 g/dm$^3$

Mean diameter of polymer particles at 500 g/kg: 400 microns fraction classified at 250–500 microns; 92.6% by weight.

Conditions 1B: Suspended in Liquid Propylene 300 mg of AlEt$_2$Cl 79.5 mg of solid catalytic complex, i.e. 68.5 mg of TiCl$_3$ hydrogen under a partial pressure of 0.3 kg/cm$^2$ 3 l of liquid propylene are introduced, while flushing with gaseous propylene, into a 5-liter autoclave which has previously been dried and is maintained in an atmosphere of dry nitrogen.

The reactor is kept at 70° C. with agitation for 90 min. The excess propylene is then discharged and the formed polypropylene, namely: 476 g of dry polypropylene, is recovered.

The α activity of the catalytic complex is 4630 and productivity amounts to 6000 g of polypropylene/g of solid catalytic complex.

The PSA of the polypropylene is 448 g/dm$^3$.

The modulus of torsional rigidity G is 700 kg/cm$^2$ and the MFI 0.7 g/10 min.

EXAMPLES 2 to 5 (TABLE 1)

In these examples the EDIA content of the solid catalytic complex is varied.

EXAMPLE 2

The reduced solid is prepared as in Example 1.

6.08 g of reduced solid are suspended in 110 ml of a solution of EDIA in hexane containing 78 g of EDIA/l of diluent (hexane).

The suspension is agitated for 100 minutes at 25° C. The treated solid obtained is then separated from the treatment medium and washed 5 times with 59 ml of hexane at 25° C.

The treated solid is then agitated for 2 hours at 40° C. in 100 ml of TiCl$_4$. The TiCl$_4$ is then eliminated and the solid catalytic complex washed 5 times with 50 ml of hexane. 5 g of solid catalytic complex is collected, its color tending towards violet and its composition and catalytic properties in the polymerization of propylene, in accordance with conditions 1a, being shown in Table 1.

EXAMPLE 3

The reduced solid is produced and treated with EDIA in accordance with Example 1.

20 g of treated solid are agitated in 65 ml of a 20 volume % solution of TiCl$_4$ in isododecane for 2 hours at 80° C.

The solid catalytic complex obtained is then separated from the reaction medium and washed 5 times with 100 ml of dry hexane.

It is then dried. 17.9 g of dry solid catalytic complex is collected. Its composition and catalytic properties in the polymerization of propylene, in accordance with conditions 1a, are indicated in Table 1.

EXAMPLE 4

The reduced solid is produced and treated with EDIA as in Examples 1 and 3.

8 g of treated solid are agitated in a solution composed of 50 ml of hexane, 35 ml of TiCl$_4$, and 10 ml of EDIA for 2 hours at 65° C.

The solid catalytic complex obtained is isolated as before. 6.5 g of violet solid catalytic complex is collected. Its composition and catalytic properties in the polymerization of the propylene, in accordance with conditions 1a, are shown in Table 1.

EXAMPLE 5

The reduced solid is precipitated and subjected to heat treatment before treatment with EDIA as in Example 1. The reduced solid is then separated from its formation medium without undergoing subsequent washing and without being dried.

The reduced solid is then agitated in a solution composed of 1700 ml of hexane and 270 ml of EDIA for 1 hour at 35° C.

The obtained treated solid is then separated from the liquid treatment medium without undergoing subsequent washing. This solid is then agitated in a solution composed of 500 ml of hexane and 350 ml of TiCl$_4$ for 2 hours at 65° C.

The resulting solid catalytic complex is then separated and washed 5 times with 500 ml of hexane and finally dried. 240 g of dry solid catalytic complex is collected. Its composition and its catalytic properties in the polymerization of propylene, in accordance with conditions 1a, are shown in Table 1.

EXAMPLES 6 AND 7 (TABLE 1)

In these examples the aluminum content in the solid catalytic complex is varied.

EXAMPLE 6

The reduced solid is precipitated and subjected to heat treatment as in Example 1. It is then separated from its formation medium and subjected to 8 washed with 500 ml of hexane at 50° C., whereupon it is agitated in a solution of 1700 ml of hexane and 250 ml of EDIA for 1 hour 30 minutes at 35° C. The obtained treated solid is then separated from the treatment medium and washed 5 times at 50° C. with 1500 ml of hexane.

The reaction with TiCl$_4$ is effected as in Example 5. 235 g of dry solid catalytic complex are collected. The composition and catalytic properties in the polymerization of propylene, in accordance with conditions 1a, are indicated in Table 1.

EXAMPLE 7

The solid catalytic complex is produced in the same way as in Example 1 except for the heat treatment in the production of the reduced solid. This treatment is here effected at 65° C. for 30 minutes. The composition and the properties in the solid catalytic complex in the polymerization of propylene, in accordance with conditions 1a, are shown in Table 1.

EXAMPLES 8 TO 10

These examples show the effect of the variation of the specific surface of the solid catalytic complex. For each of these examples the composition and catalytic properties in the polymerization of propylene in accordance with conditions 1a are indicated in Table 1.

EXAMPLE 8

The reduced solid is produced and treated with EDIA in accordance with the conditions of Example 1.

60 g of treated solid are agitated in 150 ml of a 30 volume % solution of TiCl$_4$ in hexane for 2 hours at 50° C. The obtained solid catalytic complex is then isolated as in the previous examples. 54.5 g of dry solid catalytic complex are collected.

EXAMPLE 9

45 g of treated solid (produced as in Example 1) are agitated in 100 ml of pure liquid TiCl$_4$ for 1 hour at 70° C. The TiCl$_4$ is then eliminated and the obtained solid catalytic complex is washed 5 times with 100 ml of hexane. 36.7 g of dry solid catalytic complex are collected.

EXAMPLE 10

42.5 g of reduced solid (produced as in Example 1) are agitated in a solution composed of 172 ml of hexane and 35 ml of EDIA for 1 hour at 65° C. After cooling this suspension to ambient temperature, 120 ml of pure liquid TiCl$_4$ is added to it and the resulting suspension is agitated for 2 hours at 65° C. The obtained solid catalytic complex is separated from the liquid treatment and reaction medium and washed 5 times with 100 ml of hexane. 37 g of dry solid catalytic complex are collected.

EXAMPLES 11 TO 14 (TABLE 2)

These examples relate to variations in conditions for preparation of the reduced solid. For each example Table 2 indicates the composition and catalytic properties of the obtained solid catalytic complex in the polymerization of propylene in accordance with conditions 1a.

EXAMPLE 11

The reduced solid is produced under the same conditions as in Example 1 except for the temperature of precipitation, which is here 7° C.

6.6 g of obtained reduced solid are agitated in 50 ml of hexane and 6.8 ml of EDIA, which corresponds to 1.17 mole of EDIA per mole of TiCl$_3$, for 100 minutes at 25° C. The obtained treated solid is then washed 3 times with 50 ml of hexane. The hexane is eliminated, and the treated solid is then agitated in 50 ml of pure liquid TiCl$_4$ at 40° C. for 3 hours. The TiCl$_4$ is then eliminated, and the obtained solid catalytic complex is washed with hexane in order to eliminate all remaining TiCl$_4$. 4.5 g of solid catalytic complex are collected.

EXAMPLE 12

750 ml of hexane and 500 ml of TiCl$_4$ are introduced, in an inert atmosphere, into a 6-liter reactor equipped with a two-blade agitator rotating at 160 r.p.m. The resulting solution, composed of 40% of TiCl$_4$ by volume, is cooled to 0.5° C. Within 3 hours a solution composed of 570 ml of AlEt$_2$Cl and 1500 mm of hexane is added, the temperature being kept at 0.5° C. in the reactor.

After adding the AlEt$_2$Cl-hexane solution, the production of the reduced solid and treated solid is continued as in Example 1. The treated solid, however, is not washed with hexane as in Example 1, but simply separated from its liquid treatment medium.

The treated solid is converted into a solid catalytic complex by reacting it, at 65° C. for 2 hours with 2.2 liters of a TiCl$_4$ solution in hexane containing 40% by volume of TiCl$_4$.

The TiCl$_4$ is then eliminated and the obtained solid catalytic complex is washed 5 times with 2 liters of hexane at 65° C., and thereupon dried at 50° C. by flushing with dry nitrogen. 780 g of dry solid catalytic complex are collected.

EXAMPLE 13

The reduced solid is precipitated as in Example 1, and, instead of effecting the heat treatment at 65° C., the reduced solid is left to stand in its formation medium at 25° C. for 400 hours. The reduced solid is then isolated from this medium and washed with hexane. Treatment with EDIA and reaction with TiCl$_4$ are effected as in Example 1.

EXAMPLE 14

The reduced solid is precipitated as in Example 1, but using isododecane as diluent and effecting the heat treatment by agitation for 3 hours at 90° C. The reduced solid is then separated from its formation medium and washed with hexane as in Example 1, and dried. In this reduced solid the TiCl$_4$ is essentially in the delta crystalline form.

The production of the catalytic complex is then continued as in Example 1.

EXAMPLES 15 TO 20 (TABLE 3)

For all these examples the reduced solid is produced in accordance with the conditions of Example 1. The reduced solid is converted into treated solid in all these examples within 1 hour at 35° C.; nevertheless, the molar ratio between the complexing agent and TiCl$_3$ or the concentration of the complexing agent in the diluent or the nature of the complexing agent is different for each example.

The reaction of the treated solid with TiCl$_4$, subsequent washing with hexane, and drying are effected under the conditions of Example 1. Consequently, for examples 15 to 20 there are described below only parameters relating to the concentration of the reagents resulting in the treated solid. For these examples the catalytic properties are evaluated for polymerization in accordance with conditions 1a and are indicated in Table 3.

EXAMPLE 15

58 g of reduced solid are agitated in 259 ml of an EDIA solution containing 98.5 g of EDIA per liter of hexane.

EXAMPLE 16

46.8 g of reduced solid are agitated in 197 ml of an EDIA solution containing 219 g of EDIA per liter of hexane.

EXAMPLE 17

7.25 of reduced solid are agitated in 112 ml of an EDIA solution containing 93.7 g of EDIA per liter of hexane.

EXAMPLE 18

3.95 g of reduced solid are agitated in 52.8 ml of a solution of di-n-butyl ether containing 44 g of di-n-butyl ether per liter of hexane.

EXAMPLE 19

45 g of reduced solid are agitated in 292.5 ml of a solution of di-n-butyl sulphide containing 71 g of di-n-butyl sulphide per liter of hexane.

EXAMPLE 20

53.5 g of reduced solid are agitated in 364 ml of a solution of di-n-butyl sulphide containing 182 g of di-n-butyl sulphide per liter of hexane.

EXAMPLES 21 TO 28

These examples illustrate the production of solid catalytic complex from treated solid under different conditions. In all these examples the treated solid is produced under the same conditions as those as Example 1. For each of these examples the compositions and the properties of the solid catalytic complex and the results of the polymerization of propylene in accordance with conditions 1a are indicated in Tables 4 and 5.

EXAMPLES 21 TO 24 (TABLE 4)

In these examples the treated solid is converted into solid catalytic complex by the action of undiluted liquid TiCl$_4$.

In Examples 21 and 22 the treated solid is reacted with TiCl$_4$ at 40° C. for 3 hours.

3 g of treated solid are agitated in 300 ml of TiCl$_4$ for Example 21 and 100 g of treated solid are agitated in 200 ml of TiCl$_4$ for Example 22. After reaction with TiCl$_4$, the catalytic complexes are separated from the liquid reaction medium and washed 5 times with 25 ml of hexane in Example 21 and with 500 ml of hexane in Example 22. They are finally dried.

In Example 23, 32 g of treated solid are agitated for 24 hours at 20° C. in 100 ml of TiCl$_4$. The liquid reaction medium is then separated from the resulting solid catalytic complex, and the latter is washed 5 times with 100 ml of hexane, and finally dried.

In Example 24, 35.5 g of treated solid are agitated for 1 hour at 90° C. in 100 ml of TiCl$_4$. The production of the catalytic complex is then continued as in Example 23.

EXAMPLES 25 TO 28 (TABLE 5)

In these examples the treated solid is converted into catalytic complex by the action of TiCl$_4$ diluted in an inert diluent. After the reaction with TiCl$_4$ under the described conditions, in each example the solid catalytic complex is separated from the liquid reaction medium, washed several times with hexane, and finally dried.

EXAMPLES 29 to 34 (TABLE 6)

These examples are given by way of comparison. They relate to the use (as catalytic element) of titanium trichlorides produced by reducing TiCl$_4$ with aluminum and grinding in Examples 29 to 33 (TiCl$_3$ AA sold by STAUFFER), and titanium trichlorides produced by reducing TiCl$_4$ with hydrogen and grinding in Example 34 (TiCl$_3$ HA sold by STAUFFER). For each of these examples, the properties of these solid catalytic elements are evaluated (Table 6) for polymerization of propylene according to conditions 1a.

By way of comparison, Table 7 reflects the X-ray diffraction spectrum lines recorded by means of a focusing goniometer equipped with a monochromator for the catalytic elements of Examples 1, 33 and 34.

For the catalytic elements of Examples 1 and 34 the position of the 5th line is identical and corresponds to a plane of reticular distance d=1.772 Å. In addition, in agreement with the high content of aluminum compound in the catalytic element of Example 29, a displacement of this line is observed which reflects a variation of the reticular distance, which becomes d=1.761 Å.

Moreover, the mid-height widths of certain lines indicated in Table 7, and in particular of the line corresponding to the reticular plane (d=5.85 Å), are smaller for the catalytic element of Examples 29 and 34 than with the homologous lines observed for the catalytic complex of Example 1.

Similarly, Table 7 reflects a greater maximum intensity of certain lines for the catalytic complex of Example 1, and in particular of the line corresponding to the plane of reticular distance (d=2.71 Å), than for the catalytic elements of Examples 29 and 34.

EXAMPLES 29 TO 31

These relate to the use of the first type of TiCl$_3$ (obtained by reduction of aluminum) (TiCl$_3$AA).

EXAMPLE 29

This example is comparable with Example 1 from the point of view of catalytic activity and the fraction of polypropylene soluble in the polymerization hexane. The marked superiority of the solid catalytic complex of Example 1 is noted.

EXAMPLE 30

An amount of EDIA equivalent to that contained in the solid catalytic complex of Example 1 is introduced separately into the polymerization medium.

EXAMPLE 31

An amount of EDIA markedly greater than that used in Example 30 is introduced separately into the polymerization medium. It is found that the catatlytic properties deteriorate.

EXAMPLES 32 TO 34

In Examples 32 and 34 the solid catalytic element is obtained by, respectively, applying to TiCl$_3$ of the first type (AA) and of the second type (HA) (obtained by reduction with hydrogen) the conditions of conversion of the reduced solid to treated solid of Example 1.

In Example 33, the solid obtained in Example 32 is additionally subjected to a reaction with TiCl$_4$ under the conditions of Example 1.

All these examples show that the catalytic complexes of the invention have markedly superior performance.

EXAMPLES 35 AND 36 (TABLE 8)

These examples are given by way of comparison.

In Example 35 the solid catalytic element used for polymerization in accordance with conditions 1a is the "reduced solid" prepared in Example 1.

In Example 36 the reduced solid of Example 1 is also used as catalytic element, but in addition EDIA is introduced into the polymerization medium.

Table 8

| Example No. | Al/Ti in the catalytic element | Mole of EDIA per mol of TiCl$_3$ added to the polymerization medium | α | % soluble |
|---|---|---|---|---|
| 35 | 0.46 | 0 | 325 | 23.4 |
| 36 | 0.46 | 48 | 383 | 38 |

These examples, compared with Example 1, show that the reduced solids used as catalytic element in the absence or presence of EDIA in the polymerization have catalytic properties which are markedly poorer than those of the solid catalytic complexes forming the object of the invention.

EXAMPLE 37

A "treated solid" prepared as in Example 1 is used as solid catalytic element for polymerization in accordance with conditions 1a of Example 1 (Table 9).

Table 9

| Example No. | C/Ti | Al/Ti | α | % soluble |
|---|---|---|---|---|
| 37 | 0.181 | 0.096 | 277 | 61 |

This example shows that the treated solid constitutes a poor catalytic element compared with the catalytic complex of the invention.

EXAMPLES 38 TO 40

These examples are given by way of comparison.

For all these examples the composition and the catalytic properties of the catalytic elements in the polymerization of propylene in accordance with conditions 1a of Example 1 are indicated in Table 10.

EXAMPLE 38

11.5 g of reduced solid (prepared as in Example 1) are agitated in 50 ml of TiCl$_4$ for 3 hours at 40° C. The TiCl$_4$ is eliminated and the resulting solid product is washed with hexane. After drying, the obtained solid is used as catalytic element.

EXAMPLE 39

The solid catalytic element obtained in Example 38 is then treated with EDIA in accordance with the conditions of production of the treated solid of Example 1. The resulting treated solid is washed with hexane and then dried. It is used as catalytic element.

EXAMPLE 40

9.1 g. of treated solid prepared as in Example 1 are introduced in an inert atmosphere into a 100-ml flask. This flask, while still kept in an inert atmosphere, is immersed for 15 minutes in a bath controlled by thermostat at 120° C. The product obtained is then used as catalytic element.

Table 10

| Example No. | Al/Ti | Cl/Ti | S | α | % soluble | PSA |
|---|---|---|---|---|---|---|
| 38 | 0.29 | 0 | 5 | 205 | 31 | 322 |
| 39 | — | 0 | — | 200 | 25 | 340 |
| 40 | 0.09 | 0 | 2 | 130 | 8.5 | 390 |

The catalytic elements obtained in accordance with the conditions of preparation described in Examples 38 to 40 have compositions and properties (specific surface) which are markedly different from those of the catalytic complexes of the invention; catalytic properties are decidedly poorer.

EXAMPLES 41 AND 42

These examples relate to the continuous polymerization of propylene.

In Example 41, the solid catalytic complex used is that of Example 1.

The following are introduced into a 312-liter reactor equipped with double jackets (making it possible to maintain the temperature at 70° C.) and with an agitator:

16.5 kg/h of diluent (hexane)

23.4 kg/h of propylene in order to obtain a molar ratio of C$_3$H$_6$/C$_3$H$_6$+C$_6$H$_{14}$ equal to 0.51.

2.14 g/h of catalytic complex, that is to say 1.85 g/h of TiCl$_3$, AlEt$_2$Cl as activator at the rate of 107 mg of Al/kg of hexane in order to obtain a molar ratio of AlEt$_2$Cl/TiCl$_3$ equal to 5.9 and hydrogen at the rate of 0.022% by volume of hydrogen in relation to propylene; an outlet flow of hydrogen of 88 mg/h is then obtained.

The mean residence time in the reactor is 5 hours, and a production of 15 kg of dry product per hour is thus obtained. Under these conditions, a polymer suspension density in the reactor of 237 g of solid per liter (376 g of solid per kg) of suspension is obtained. The rate of conversion of propylene is 64%.

At the outlet of the reactor the hexane and unconverted propylene are stripped with the aid of water.

Table 11 indicates the productivity of the solid catalytic complex in this continuous polymerization, expressed in g of polypropylene/g of TiCl$_3$, as well as the physical characteristics of the polypropylene obtained.

In Example 42 (given by way of comparison) the solid catalytic element of Example 29 (TiCl$_3$ prepared by reducing TiCl$_4$ with aluminum and grinding) is used in accord with the same conditions of time, temperature, propylene concentration, and concentration of catalytic system (catalytic element+AlEt$_2$Cl) as employed in Example 41.

The productivity and characteristics of polypropylene are indicated in Table 11.

The productivity of the catalytic complex forming the object of the invention is higher than that of the reference catalytic element. The Ti content of the polymer is consequently much lower.

The properties of the polypropylene are likewise better in Example 41; in particular, far higher isotacticity is achieved.

The polymer powder has a much closer granulometry in the case of Example 41.

Table 11

| Example No. | Productivity | Ti ppm | G | MFI | % isotactic diads | PSA | Mean diameter of fluff microns |
|---|---|---|---|---|---|---|---|
| 41 | 8400 | 37 | 748 | 1.2 | 94.6 | 426 | 600 |
| 42 | 2400 | 125 | 650 | 2.5 | 89 | 257 | 370 |

EXAMPLE 43

This example relates to the production of a polypropylene having good low temperature impact strength with the aid of the catalytic complex of Example 1 in the presence of AlEt$_2$Cl as activator.

In order to produce this polymer, propylene is polymerized, and then, without isolating the polymer form, and without destroying the catalyst, copolymerization of ethylene and propylene is carried out. A "block copolymer" is thus obtained.

900 mg of AlEt$_2$Cl or 7.45 mmoles
1 liter of hexane
174 mg of the catalytic complex of Example 1, that is to say 150 mg of TiCl$_3$ or 0.975 mmole, so as to obtain the molar ratio of AlEt$_2$Cl/TiCl$_3$ of 7.6 are introduced, in the order shown, into a 5-liter autoclave.

The polymerization medium is heated to 60° C. and an absolute partial pressure of H$_2$ of 0.8 kg/cm$^2$ is produced, followed by the introduction of propylene to obtain an effective total pressure of 11.25 kg/cm$^2$, in order to obtain the molar fraction C$_3$H$_6$/C$_3$H$_6$+C$_6$H$_{14}$=0.5.

This pressure and this temperature are kept constant for 3 hours, with agitation. The propylene pressure is then relaxed until an effective pressure of 0.325 kg/cm$^2$ is obtained at 60° C.

Ethylene is then introduced in order to bring the total effective pressure to 1.15 kg/cm$^2$, and copolymerization is continued for 100 minutes. The copolymerization is then stopped by the discharge of gas and the addition of 5 ml of anhydrous ethanol.

The autoclave is cooled and the "block copolymer" is collected by filtration and drying under reduced pressure.

471 g of polymer are collected, together with 11 g of polymer from the hexane, after evaporation.

The productivity of the catalytic complex in this copolymerization amounts to 3140 g of copolymer/g TiCl$_3$, and the soluble polymer fraction amounts to 2.3% referred to the total polymer formed.

The characteristics of the block copolymer are:
G: 827 kg/cm$^2$
MFI: 1.1 dg/min
PSA: 402 g/dm$^3$
fragility temperature according to standard ASTM D 746-64 T:−6° C.
C$_2$H$_4$ content of the copolymer, determined by nuclear magnetic resonance: 12% by weight
Melting temperature measured by differential thermal analysis (DTA):
Block C$_3$:167° C.
Block C$_2$C$_3$:124° C.

EXAMPLE 44—Polymerization of butene 6 mmoles of AlEt$_2$Cl
500 ml of dry hexane
346 ml of solid catalytic complex (1.95 mmole of TiCl$_3$) prepared in accordance with Example 1.

are introduced in succession into a dry 3-liter stainless steel autoclave which has been flushed out with the aid of nitrogen, the molar ratio of AlEt$_2$Cl/TiCl$_3$ then being about 3.

The autoclave is heated to 60° C. with agitation, and then an absolute pressure of hydrogen of 1 kg/cm$^2$ is obtained, whereupon 50 ml of butene are introduced.

After 90 minutes the residual butene is discharged and 23 g of polybutene collected.

The yield amounts to about 77% by weight.

EXAMPLE 45—POLYMERIZATION OF ETHYLENE 1 liter of dry hexane
600 mg of AlEt$_2$Cl
64 mg of the solid catalytic complex of Example 1 are introduced in succession into a dry 3-liter stainless steel autoclave which has been flushed out with the aid of nitrogen.

The autoclave is heated to 85° C. with agitation, while establishing a partial pressure of hydrogen of 4 kg/cm$^2$, whereupon ethylene is introduced so as to obtain a partial pressure of this gas of 10 kg/cm$^2$.

At the end of 2 hours the residual monomer gas is discharged and 194 g of polyethylene of PSA 440 g/dm$^3$ are collected.

Catalytic complexes described herein have a chemical composition corresponding to the general formula:

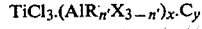

$$TiCl_3 \cdot (AlR_{n'}X_{3-n'})_x \cdot C_y$$

wherein
R is a hydrocarbon radical containing from 1 to 18 carbon atoms;
X is a halogen, i.e. chlorine, bromine, iodine or fluorine;
n' is any number such that $0 \leq n' \leq 2$;
C is a complexing agent, such as an organic compound containing at least one atom or group having one or more pairs of free electrons (capable of effecting coordination with aluminum and/or titanium) and containing from 1 to 30 carbon atoms per such atom or group, e.g. a compound of one of the formulae: R'—O—R", R'—S—R" and R'—SH;

each of R' and R" is, independently, a hydrocarbon having from 1 to 15, preferably from 2 to 8, carbon atoms;

x is any positive number lower than 0.30; and y is any number higher than 0.001.

They are solids useful for stereospecific polymerization of α-olefins and having the following properties:

(a) specific surface—in excess of 75 m²/g;

(b) total porosity—in excess of 0.15 cc/g;

(c) apparent density—in excess of 0.6 kg/dm³;

(d) particle diameter—between 5 and 100 microns (μ);

(e) physical constitution—spherical particles composed of microparticles of cellular structure;

(f) X-ray diffraction spectrum—a line corresponding to the plane of reticular distance 1.772 Å; the line corresponding to the plane of reticular distance 5.85 Å is wider than that in the spectra obtained from $TiCl_3$ prepared by reduction of $TiCl_4$ with hydrogen and grinding; the peak corresponding to the plane of reticular distance 2.7 Å has a height greater than that of the corresponding peak recorded in spectra obtained from $TiCl_3$ prepared by hydrogen reduction of $TiCl_4$ and grinding.

Catalytic systems for stereospecific polymerization of α-olefins comprise an admixture of solid catalytic complex (based on $TiCl_3$) and activator; the complex has been well characterized, and the activator is an organometallic compound wherein the metal is one from groups Ib, IIb or IIIb of the Periodic Table, e.g. a compound of the general formula:

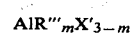

wherein

X' is a halogen, i.e. chlorine, bromine, fluorine or iodine;

m is a positive number which does not exceed 3; and

R''' is a hydrocarbon radical containing from 1 to 18 carbon atoms.

Polymerization of α-olefin with Ziegler-Natta type catalysts is well known. Stereospecific polyolefins obtained with the instant novel catalytic systems are useful in the same manner and for the same purposes as corresponding stereospecific polyolefin counterparts prepared with previously-known catalysts.

These polyolefins may be used for producing useful articles according to the methods well-known in the art of polymer-processing such as injection-molding, blow-molding, extrusion-molding and melt-spinning.

It will be understood that the above description of the present invention is susceptible to various modifications, changes, and adaptations, and the same are intended to be comprehended within the meaning and range of equivalents of the appended claims.

Table 1

| Example No. | C/Ti | Al/Ti | S | α | % soluble | Insoluble G | MFI | PSA |
|---|---|---|---|---|---|---|---|---|
| 2 | 0.0094 | 0.081 | 79 | 610 | 5 | 843 | 3.5 | 403 |
| 3 | 0.0108 | 0.051 | 117 | 760 | 2.2 | 817 | 3.7 | 420 |
| 4 | 0.0975 | 0.055 | 151 | 1610 | 2.7 | 901 | 3.8 | 381 |
| 5 | 0.109 | 0.097 | 140 | 1347 | 2.7 | 968 | 3.8 | 390 |
| 6 | 0.026 | 0.0078 | 183 | 1260 | 1.1 | 832 | 2.4 | 430 |
| 7 | 0.089 | 0.18 | 162 | 1300 | 3.5 | 792 | 2 | 302 |
| 8 | 0.042 | 0.101 | 95 | 1235 | 4.4 | 888 | 3.3 | 358 |
| 9 | 0.049 | 0.08 | 151 | 1351 | 2.8 | 840 | 4.4 | 438 |
| 10 | 0.062 | 0.046 | 205 | 1656 | 1.2 | 768 | 1.2 | 479 |

Table 2

| Example No. | C/Ti | Al/Ti | α | % soluble | Insoluble G | MFI | PSA |
|---|---|---|---|---|---|---|---|
| 11 | 0.035 | 0.143 | 754 | 3.6 | 743 | 3.2 | 350 |
| 12 | 0.091 | 0.035 | 1520 | 1.8 | 905 | 2.0 | 386 |
| 13 | 0.01 | 0.08 | 800 | 2 | 800 | 2 | 400 |
| 14 | 0.03 | 0.08 | 523 | 6.2 | 866 | 4.5 | 339 |

Table 3

| | Production of treated solid | | | Characteristics of solid catalytic complex | | | Properties of solid catalytic complex | | | | |
|---|---|---|---|---|---|---|---|---|---|---|---|
| Example No. | Nature of complexing agent | C/Ti used | Mole of TiCl₃ per liter of diluent | C/Ti | Al/Ti | S | α | % soluble | Insoluble G | MFI | PSA |
| 15 | Diisoamyl ether | 0.54 | 1.16 | 0.031 | 0.066 | 163 | 848 | 1.2 | 701 | 1.4 | 507 |
| 16 | | 0.96 | 1.44 | 0.056 | — | 158 | 1305 | 2.2 | 800 | 3.2 | 359 |
| 17 | | 1.77 | 0.33 | — | 0.05 | — | 1160 | 7 | 757 | 3.1 | 364 |
| 18 | Di-n-butyl ether | 0.93 | 3.64 | 0.029 | 0.033 | — | 827 | 1.8 | 773 | 4.4 | 348 |
| 19 | | 0.62 | 0.77 | 0.0465 | 0.042 | 117 | 350 | 2.2 | 819 | 1.8 | 500 |
| 20 | Dibutyl sulphide | 1.51 | 0.82 | 0.0535 | 0.06 | 110 | 460 | 1.02 | 857 | 3.7 | 400 |

Table 4

| Example No. | g treated solid 1 of TiCl₄ | Temperature °C. | Time (hour) | C/Ti | S | α | % soluble | Insoluble G | MFI | PSA |
|---|---|---|---|---|---|---|---|---|---|---|
| 21 | 10 | 40 | 3 | 0.056 | 146 | 1146 | 2.8 | 781 | 3.9 | 414 |

Table 4-continued

| Example No. | g treated solid 1 of TiCl$_4$ | Temperature °C. | Time (hour) | C/Ti | S | α | % soluble | Insoluble G | MFI | PSA |
| --- | --- | --- | --- | --- | --- | --- | --- | --- | --- | --- |
| 22 | 500 | 40 | 3 | 0.03 | — | 1179 | 3.0 | 801 | 3.6 | 387 |
| 23 | 320 | 20 | 24 | 0.038 | 131 | 835 | 1.9 | 776 | 3.8 | 410 |
| 24 | 355 | 90 | 1 | 0.027 | 118 | 505 | 3 | 922 | 5.1 | 352 |

Table 5

| Example No. | g treated solid 1 of solution | Reaction with TiCl$_4$ Temperature °C. | Time (hour) | % volume TiCl$_4$ in the solution | Solid catalytic complex C/Ti | Al/Ti | S | α | % soluble | Insoluble G | MFI | PSA |
| --- | --- | --- | --- | --- | --- | --- | --- | --- | --- | --- | --- | --- |
| 25 | 86 | 65 | 0.5 | 28.6 | 0.054 | 0.048 | 172 | 770 | 3.5 | 660 | 4.6 | 495 |
| 26 | 89 | 65 | 3 | 28.6 | 0.045 | 0.023 | 156 | 900 | 1.6 | 767 | 4.0 | 490 |
| 27 | 148 | 80 | 1 | 20 | 0.034 | 0.054 | 123 | 760 | 2.2 | 817 | 3.7 | 420 |
| 28 | 208 | 80 | 1 | 50 | 0.030 | — | 150 | 828 | 2.3 | 855 | 5.9 | 460 |

Table 6

| Ex. No. | Characteristics of the solid catalytic element C/Ti | Al/Ti | S | Liquid EDIA added to the polymerization medium mole of EDIA/ mole of TiCl$_3$ | α | % soluble |
| --- | --- | --- | --- | --- | --- | --- |
| 29 | 0 | 0.33 | 56 | 0 | 320 | 9 |
| 30 | 0 | 0.33 | — | 0.03 | 352 | 7.8 |
| 31 | 0 | 0.33 | — | 0.6 | 410 | 33.4 |
| 32 | 0.043 | 0.32 | 55 | 0 | 435 | 14 |
| 33 | 0.008 | 0.185 | 62 | 0 | 362 | 8.3 |
| 34 | 0.005 | 0 | — | 0 | 88 | 15 |

Table 7

| Example No. | | 1 | | | | | | 29 | | | | |
| --- | --- | --- | --- | --- | --- | --- | --- | --- | --- | --- | --- | --- |
| Reticular distance Å | | 5.85 | 5.27 | 2.97 | 2.71 | 1.772 | 1.696 | 5.85 | 5.24 | 2.94 | 2.66 | 1.761 | 1.698 |
| Relative intensity | Integrated value S/S0 | 50 | 44 | 13 | 100 | 34 | 15 | 58 | 28 | 15 | 100 | 30 | 14 |
| | Maximum value H/HO | 93 | 58 | 26 | 133 | 100 | 27 | 238 | 62 | 50 | 98 | 100 | 26 |
| Width of line at mid-height, angle 2 theta in degrees | | 1.69 | 2.36 | 1.67 | 2.09 | 0.90 | 1.31 | 0.81 | 1.28 | 1.04 | 3.84 | 1.06 | 1.80 |

| | | Example No. | | | 34 | | |
| --- | --- | --- | --- | --- | --- | --- | --- |
| | Reticular distance Å | | 5.90 | 5.27 | 2.94 | 2.67 | 1.772 | 1.705 |
| | Relative intensity | Integrated value S/SO | 63 | 39 | 23 | 100 | 34 | 16 |
| | | Maximum value H/HO | 238 | 55 | 60 | 93 | 100 | 29 |
| | Width of line at mid-height, angle 2 theta in degrees | | 0.71 | 1.95 | 0.87 | 2.96 | 0.84 | 1.55 |

We claim:

1. A solid titanium trichloride which is a catalytic complex for stereospecific α-olefin polymerization having a specific surface greater than 75 square meters per gram and a total porosity higher than 0.15 cm$^3$/g, said titanium trichloride having the formula $$TiCl_3 \cdot (AlR_{n'}X_{3-n'})_x \cdot (C)_y$$

wherein

R is a hydrocarbon radical with from 1 to 18 carbon atoms;

X is a halogen;

n' is a number from 0 to 2, inclusive

C is a complexing agent which is an organic compound with at least one atom or group having at least one pair of free electrons capable of effecting coordination with titanium or aluminum, and is a compound of one of the formulae:

$$R'-O-R'', \quad R'-S-R'' \text{ and } R'-SH$$

wherein

R' is a hydrocarbon radical with from 1 to 15 carbon atoms, and

R'' is a hydrocarbon radical with from 1 to 15 carbon atoms;

x is any number less than 0.30; and y is any number higher than 0.001.

2. A solid catalytic complex according to claim 1 in the form of spherical particles composed of microparticles of cellular structure.

3. A noncomminuted titanium trichloride according to claim 1 in the form of spherical particles composed of microparticles of cellular structure.

4. Solid particles of a titanium trichloride which is a catalyst for the stereospecific polymerization of alpha-olefins, said particles being composed of microparticles of cellular structure and having a specific surface area greater than 75 square meters per gram and a total porosity higher than 0.15 cubic centimeters per gram, said titanium trichloride having the formula $$TiCl_3 \cdot (AlR_{n'}X_{3-n'})_x \cdot (C)_y$$

wherein
R is a hydrocarbon radical with from 1 to 18 carbon atoms;
X is a halogen;
n' is a number from 0 to 2, inclusive;
C is a complexing agent which is an organic compound with at least one atom or group having at least one pair of free electrons capable of effecting coordination with titanium or aluminum, and is a compound of one of the formulae:

R'—O—R", R'—S—R" and R'—SH wherein
R' is a hydrocarbon radical with from 1 to 15 carbon atoms; and
R" is a hydrocarbon radical with from 1 to 15 carbon atoms;
x is any number less than 0.30; and
y is any number higher than 0.001.

5. Solid particles according to claim 4 having diameters between 5 and 100 microns.

6. Solid particles according to claim 4 and having an X-ray diffraction spectrum with a line corresponding to the plane of reticular distance 1.772 Å.

7. Solid particles according to claim 4 and having an X-ray diffraction spectrum wherein the peak corresponding to the plane of reticular distance 2.7 Å has a height greater than that of the corresponding peak for spectra obtained from TiCl3 prepared by hydrogen reduction of TiCl4 and grinding.

8. Solid particles according to claim 4 wherein the complexing agent is of the formula:

R'—O—R"

wherein each of R' and R" is, independently, a hydrocarbon radical having from 2 to 8 carbon atoms.

9. Solid particles according to claim 4 having a specific surface in excess of 125 square meters per gram and a total porosity in excess of 0.20 cubic centimeters per gram.

10. Solid particles according to claim 4 having a specific surface area between about 150 and about 200 square meters per gram.

11. Solid particles according to claim 4 wherein y is a number up to about 0.11.

12. Solid particles according to claim 4 wherein the microparticles are of spherical shape.

13. Solid particles according to claim 4 in which said microparticles have diameters between 0.05 and 1 micron.

14. Solid particles according to claim 4 in which the microparticles are composed of microcrystallites with dimensions in the order of 50 to 100 Å.

15. Solid particles according to claim 4 in which the microparticles make the major contribution to the total porosity.

16. Solid particles according to claim 4 having a specific surface greater than 125 square meters per gram and a total porosity higher than 0.20 cubic centimeters per gram, said particles having diameters between 15 and 50 microns composed of microparticles of cellular structure having diameters between 0.1 and 0.3 micron.

17. Solid particles according to claim 16 in which the pores having radii smaller than 200 Å make the major contribution to the total porosity.

18. Solid particles according to claim 16 having a porous volume attributable to pores having radii of less than 200 Å which is greater than about 0.11 cubic centimeters per gram.

19. Solid particles according to claim 16 having a porous volume attributable to pores having radii of less than 200 Å which is greater than about 0.16 cubic centimeters per gram.

20. Solid particles according to claim 4 having an X-ray diffraction spectrum featuring a widening of the line corresponding to the plane of reticular distance 5.85 Å.

21. Solid particles according to claim 4 belonging to the definition of the delta crystalline form.

22. Solid particles according to claim 4 having X-ray diffraction spectrum lines in positions essentially identical with those of titanium trichloride obtained by hydrogen reduction of TiCl4 and grinding.

23. Solid particles according to claim 4 wherein
R is an alkyl radical with from 2 to 6 carbon atoms;
X is chlorine;
C is of the formula R'—O—R" wherein each of R' and R" is, independently, a hydrocarbon radical having from 2 to 8 carbon atoms;
x is any number less than 0.20 and
y is any number higher than 0.009.

24. Solid particles according to claim 23 wherein each of R' and R" is, independently, a hydrocarbon radical having from 4 to 6 carbon atoms;
x is any number less than 0.20 and
y is any number higher than 0.009 and up to 0.11.

25. Solid particles according to claim 4 having a specific surface between about 125 and 205 square meters per gram and a total porosity higher than 0.15 and up to 0.29 cubic centimeters per gram.

26. Solid particles according to claim 25 wherein
R is a hydrocarbon radical with from 1 to 18 carbon atoms; and
y is any number higher than 0.001 and up to 0.11.

27. Solid particles according to claim 4, said particles being in the form of spherical particles which
(a) are composed of microparticles of cellular structure, the microparticles having a particle diameter between 0.05 and 1 micron and being composed of microcrystallites with dimensions in the order of 50 to 100 Å,
(b) have a specific surface area greater than 75 and up to about 205 square meters per gram which is not attributable to grinding, (c) have a total porosity in excess of 0.15 and up to about 0.29 cubic centimeters per gram, and (d) have a particle diameter of between 5 and 100 microns and a narrow distribution of diameters around a mean value.

28. A catalytic system for stereospecific α-olefin polymerization and comprising a solid catalytic complex according to claim 4 and activator, the activator being an organometallic compound the metal of which is a metal of one of groups Ia, IIa and IIIa of the Periodic Table.

29. A catalytic system according to claim 28 wherein the activator is a compound of the formula:

$$AlR'''_m X'_{3-m}$$

wherein
R''' is a hydrocarbon radical with from 1 to 18 carbon atoms;
X' is a halogen; and
m is any positive number of at most 3.

30. A catalyst system according to claim 28 wherein the activator is diethylaluminum chloride.

31. In stereospecific α-olefin polymerization with a catalytic system, the improvement wherein the catalytic system is according to claim 28.

32. A process according to claim 31 wherein the α-olefin contains from 2 to 18 carbon atoms.

33. A process according to claim 32 wherein the α-olefin is propylene.

34. A process for preparing a solid titanium trichloride catalytic complex which comprises (a) reducing TiCl4 with a reducing agent of the formula $$AlR_n X_{3-n}$$

wherein
R is a hydrocarbon radical with from 1 to 18 carbon atoms,
X is a halogen and
n is a positive number which is at most 3;
(b) treating thus-obtained reduced solid with a complexing agent, which is an organic compound with at least one atom or group having at least one pair of free electrons capable of effecting coordination with titanium or aluminum and is a compound of one of the formulae:

R'—O—R", R'—S—R" and R'—SH wherein

R' is a hydrocarbon radical with from 1 to 15 carbon atoms and
R" is a hydrocarbon radical with from 1 to 15 carbon atoms;
(c) reacting resulting treated solid with TiCl4 and
(d) separating the catalytic complex thus formed.

35. A process according to claim 34 wherein the reducing agent is diethylaluminum chloride.

36. A process according to claim 34 wherein reducing TiCl4 is effected in an inert diluent.

37. A process according to claim 34 wherein reducing TiCl4 is effected at a temperature within the range of from −100° C. to 30° C.

38. A process according to claim 34 which comprises heat treating the reduced solid at a temperature in the range of from 20° to 120° C. in medium in which it is formed and prior to treating such said reduced solid with a complexing agent.

39. A process according to claim 34 wherein treating reduced solid with a complexing agent is effected in an inert diluent, the content of TiCl3 in the reduced solid being between 0.03 and 4 moles per liter of diluent, and the amount of complexing agent being between 0.1 and 2.5 moles per mole of TiCl3 in the reduced solid.

40. A process according to claim 34 wherein treating the reduced solid is effected at a temperature within the range of from 0° to 80° C.

41. A process according to claim 34 wherein treating the reduced solid is effected for a period in excess of five minutes.

42. A process according to claim 34 wherein reacting treated solid with TiCl4 is effected at a temperature within the range of from −30° C. to +100° C.

43. A process according to claim 34 wherein reacting treated solid with TiCl4 is effected in an inert diluent in which TiCl4 is present in a concentration in excess of 15 percent by volume.

44. A process according to claim 34 which comprises washing the formed catalytic complex with inert diluent.

45. The process according to claim 34 wherein the complexing agent is of the formula:

R'—O—R"

wherein each of R' and R" is, independently, a hydrocarbon radical having from 2 to 8 carbon atoms.

46. The process according to claim 45 wherein each of R' and R" is, independently, a hydrocarbon radical having from 4 to 6 carbon atoms.

* * * * *